Aug. 30, 1955        J. SILVA        2,716,571
GAMBREL
Filed Feb. 17, 1953
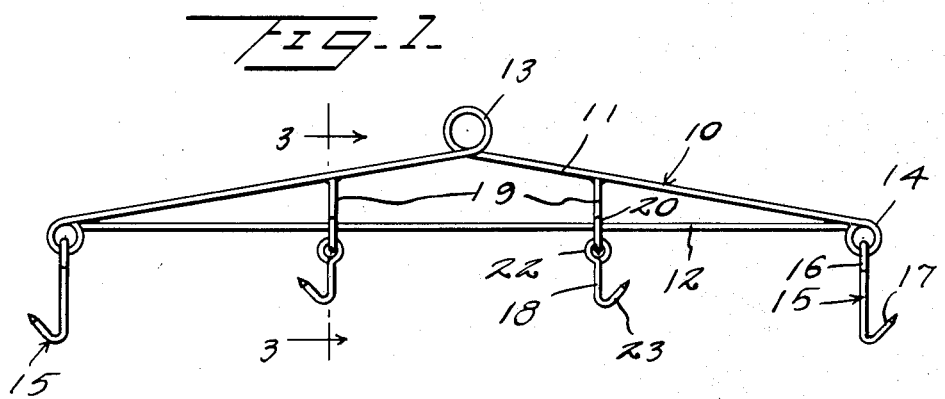
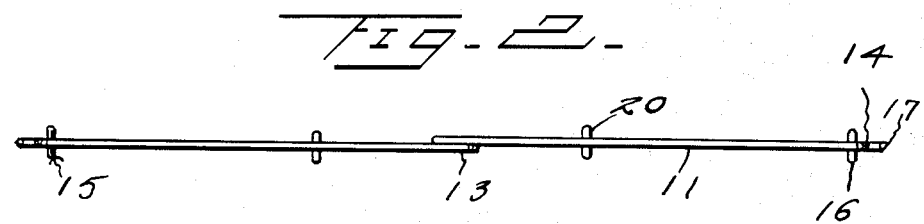
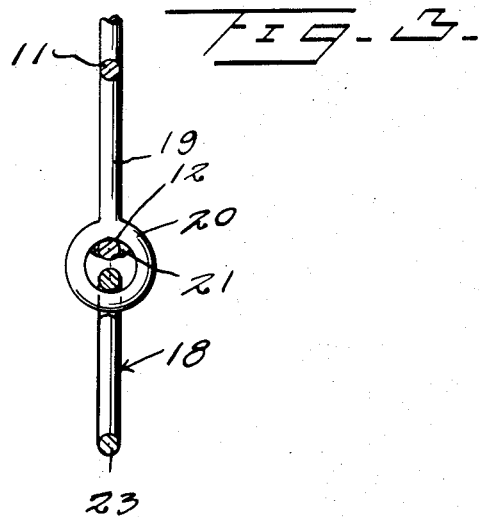
INVENTOR
John Silva
BY *Kimmel & Crowell*
ATTORNEYS

United States Patent Office 2,716,571
Patented Aug. 30, 1955

2,716,571
GAMBREL

John Silva, Yreka, Calif.

Application February 17, 1953, Serial No. 337,339

2 Claims. (Cl. 294—79)

This invention relates to a gambrel for use by hunters or the like.

In the hunting of large game animals it is desirable that the animals be cleaned as soon as possible after being killed, and where the animal is to be consumed it is desirable that a suspension means be provided to facilitate the skinning and cutting up of the carcass. It is, therefore, an object of this invention to provide a gambrel or suspension element which can be used for cleaning and skinning the carcass, and also for splitting and quartering the carcass in addition to suspending the carcass out of reach of other animals.

Another object of this invention is to provide an improved gambrel which embodies a supporting frame with a plurality of suspension hooks carried by the frame for piercing portions of the animal and securely holding the same so that the desired operations may be performed.

A further object of this invention is to provide an improved gambrel which is simple in construction and compact in size so that it will occupy only a small space.

With the above and other objects in view, my invention consists in the arrangement, combination and details of construction disclosed in the drawing and specification, and then more particularly pointed out in the appended claims.

In the drawings—

Figure 1 is a detailed front elevation of a gambrel constructed according to an embodiment of this invention, Figure 2 is a plan view of the device, Figure 3 is a fragmentary sectional view taken on the line 3—3 of Figure 1.

Referring to the drawing, the numeral 10 designates generally a supporting frame which is formed of a pair of downwardly and outwardly divergent bars or rods 11 which at their inner ends have formed integral therewith a suspension ring or eye 13.

The frame 10 is of triangular configuration and the outer ends of the rods 11 are connected together by a horizontal bracing rod 12. An outer eye or ring 14 is formed integral with the outer ends of the rods 11 and the outer ends of the horizontal or base rod 12 are welded or otherwise secured to the junction between the rings 14 and the outer ends of the rods 11.

A suspension hook 15 having an eye 16 loosely engages the outer eye or ring 14 and the hooks 15 are provided with outwardly directed bills 17. An inner pair of suspension hooks 18 are supported from the frame 10 by means of vertical rods 19 which are welded at their upper ends to the rods 11 and are formed with eyes or rings 20 through which the base rod 12 engages. The rod 12 is welded as at 21 to the eyes or rings 20. Each hook 18 is formed with an eye or ring 22 which loosely engages the eye or ring 20, and the hooks 18 are formed with outwardly directed bills 23.

In the use of this device, the frame 10 is suspended from a suitable support which may be either outdoors or indoors and a suspension rope or cable is engaged through the suspension eye or ring 13. Where the carcass is to be skinned the rear legs of the carcass are mounted on the outer hooks 15. The carcass can then be skinned in the conventional manner and the entrails removed therefrom. The carcass may then be split and quartered, the pieces of the carcass then engaged on both the outer hooks 15 and the inner hooks 18. Where the gambrel is disposed outdoors, the device may be suspended from a height sufficient to prevent animals from contacting with the cleaned and cut carcass. This device will firmly support the carcass in a manner so that the carcass can be cleaned and cut up as may be desired, with the cut pieces suspended in an out of the way position. When the device is not in use it may be placed in a vehicle and being compact in size will occupy only a relatively small space.

I do not mean to confine myself to the exact details of construction herein disclosed, but claims all variations falling within the purview of the appended claims.

What I claim is:

1. A gambrel comprising a bar bent to form a centrally disposed suspension eye for said bar, a pair of downwardly diverging oppositely extending legs integrally formed from said bars, loops bent in the lower end of each of said legs, a cross bar welded at its opposite ends to said loops, a vertically extending member welded to each of said legs intermediate said eye and said loop, said members having their lower ends welded to said cross bar, and eyes formed on the lower ends of said members for receiving and supporting additional hooks.

2. A device as claimed in claim 1 in which said cross bar passes through said eyes on the lower ends of said members.

References Cited in the file of this patent

UNITED STATES PATENTS

| 957,344 | Kaiserlik | May 10, 1910 |
| 1,350,632 | Albrecht | Aug. 24, 1920 |
| 1,624,320 | Demmer | Apr. 12, 1927 |